(12) United States Patent
Chang et al.

(10) Patent No.: US 9,738,814 B2
(45) Date of Patent: Aug. 22, 2017

(54) METHOD OF CONTROLLING BLOCK COPOLYMER CHARACTERISTICS AND ARTICLES MANUFACTURED THEREFROM

(71) Applicants: Dow Global Technologies LLC, Midland, MI (US); ROHM AND HAAS ELECTRONIC MATERIALS LLC, Marlborough, MA (US)

(72) Inventors: Shih-Wei Chang, Natick, MA (US); Jong Keun Park, Westborough, MA (US); John W. Kramer, Mt. Pleasant, MI (US); Erin B. Vogel, Midland, MI (US); Phillip D. Hustad, Natick, MA (US); Peter Trefonas, III, Medway, MA (US)

(73) Assignees: DOW GLOBAL TECHNOLOGIES LLC, Midland, MI (US); ROHM AND HAAS ELECTRONIC MATERIALS LLC, Marlborough, MA (US)

( * ) Notice: Subject to any disclaimer, the term of this patent is extended or adjusted under 35 U.S.C. 154(b) by 0 days.

(21) Appl. No.: 14/580,307

(22) Filed: Dec. 23, 2014

(65) Prior Publication Data
US 2015/0184024 A1 Jul. 2, 2015

Related U.S. Application Data

(60) Provisional application No. 61/922,209, filed on Dec. 31, 2013.

(51) Int. Cl.
*C09D 183/10* (2006.01)
*C08G 77/16* (2006.01)
*C08G 77/442* (2006.01)

(52) U.S. Cl.
CPC .......... *C09D 183/10* (2013.01); *C08G 77/16* (2013.01); *C08G 77/442* (2013.01); *Y10T 428/31663* (2015.04)

(58) Field of Classification Search
None
See application file for complete search history.

(56) References Cited

U.S. PATENT DOCUMENTS

| | | |
|---|---|---|
| 3,051,684 A | 8/1962 | Morton |
| 3,257,476 A | 6/1966 | Tobolsky |
| 3,483,270 A | 12/1969 | Bostick |
| 3,665,052 A | 5/1972 | Saam |
| 3,890,405 A | 6/1975 | Kendrick |
| 3,974,078 A | 8/1976 | Crystal |
| 4,550,139 A | 10/1985 | Arkles |
| 5,281,666 A | 1/1994 | Hoxmeier |
| 5,296,574 A | 3/1994 | Hoxmeier |
| 5,587,223 A | 12/1996 | White |
| 5,686,549 A | 11/1997 | Grainger |
| 5,948,470 A | 9/1999 | Harrison |
| 6,025,117 A | 2/2000 | Nakano |
| 6,565,763 B1 | 5/2003 | Asakawa |
| 6,746,825 B2 | 6/2004 | Nealey |
| 7,799,416 B1 | 9/2010 | Chan |
| 7,901,866 B2 | 3/2011 | Ito |
| 8,268,732 B2 | 9/2012 | Sills |
| 8,304,493 B2 | 11/2012 | Millward |
| 8,513,356 B1 | 8/2013 | Sharma et al. |
| 8,697,810 B2 | 4/2014 | Vogel et al. |
| 2006/0249784 A1 | 11/2006 | Black |
| 2007/0049155 A1 | 3/2007 | Moro |
| 2008/0193658 A1 | 8/2008 | Millward |
| 2008/0233435 A1 | 9/2008 | Hasegawa |
| 2008/0311402 A1 | 12/2008 | Jung et al. |
| 2009/0182093 A1 | 7/2009 | Cheng |
| 2010/0151393 A1 | 6/2010 | Kim et al. |
| 2011/0256359 A1 | 10/2011 | Colburn |
| 2011/0272381 A1 | 11/2011 | Millward |
| 2012/0088188 A1* | 4/2012 | Trefonas ............ B81C 1/00031 430/270.1 |
| 2012/0107583 A1 | 5/2012 | Xiao |
| 2013/0045361 A1 | 2/2013 | Willson |

(Continued)

FOREIGN PATENT DOCUMENTS

WO    WO2009137678 A1    11/2009

OTHER PUBLICATIONS

Bosman et al., "A Modular Approach toward Functionalized Three-Dimensional Macromolecules: From Synthetic Concepts to Practical Applications" J. Am. Chem. Soc., 2003, 125 (3), 715-728.
Hahm, J. and Siebener, S. J., "Cylinder Alignment in Annular Structures of Microphase-Separated Polystyrene-b-Poly (methyl methacrylate)" Langmuir, 2000, 16 (11), pp. 4766-4769.
Han, E.; Stuen, K. O.; La, Y. H.; Nealey, P. F.; Gopalan, P., "Effect of Composition of Substrate-Modifying Random Copolymers on the Orientation of Symmetric and Asymmetric Diblock Copolymer Domains" Macromolecules 2008, 41 (23), 9090-9097.
Jung, S. J. and Ross, C. A., "Orientation-Controlled Self-Assembled Nanolithography Using a Polystyrene-Polydimethylsiloxane Block Copolymer" Nano Letters, 2007, 7, pp. 2046-2050.
Li et al., "Confinement of Block Copolymers on Patterned Surfaces" Macromolecules, 1997, 30 (26), pp. 8410-8419.
Liu, et al. "Fabrication of Lithographically Defined Chemically Patterned Polymer Brushes and Mats" Macromolecules 2011, 44 (7), pp. 1876-1885.
Mansky et al. "Nanometer Scale Periodic Modulation of a 2-D Electron System with Block Copolymers" Bull. Am. Phys. Soc. 36 (1991) 1051.

(Continued)

*Primary Examiner* — Jeffrey Mullis
(74) *Attorney, Agent, or Firm* — Cantor Colburn LLP

(57) ABSTRACT

Disclosed herein is a composition comprising a brush polymer; where the brush polymer comprises a reactive moiety that is reacted to a substrate upon which it is disposed; and a block copolymer; where the block copolymer comprises a first block and a second block that are covalently bonded to each other; where the first block comprises a first polymer and a second block comprises a second polymer; where the first polymer comprises less than or equal to 10 atomic percent polysiloxane; where the second polymer comprises at least 15 atomic percent polysiloxane; where the brush polymer is chemically different from the first polymer and the second polymer; and where the first polymer is chemically different from the second polymer; and wherein the block copolymer is disposed upon the brush polymer.

13 Claims, 8 Drawing Sheets

(56) References Cited

U.S. PATENT DOCUMENTS

| | | |
|---|---|---|
| 2013/0171429 A1 | 7/2013 | Liu |
| 2013/0209344 A1 | 8/2013 | Chang |
| 2013/0209755 A1* | 8/2013 | Hustad .................. G03F 7/0002 |
| | | 428/195.1 |
| 2014/0335324 A1 | 11/2014 | Kim |
| 2015/0184024 A1 | 7/2015 | Chang |

OTHER PUBLICATIONS

Mansky, P.; Chaikin, P. M.; Thomas, E. L. J. "Monolayer Films of Diblock Copolymer Microdomains for Nanolithographic Applications" Journal of Material Science 30 (1995) pp. 1987-1992.

Mansky, P.; Liu, Y.; Huang, E.; Russell, T. P.; Hawker, C. J., "Controlling Polymer-Surface Interactions with Random Copolymer Brushes" Science 1997, 275 (5305), 1458-1460.

Nealey et al., "Fabrication of Lithographically Defined Chemically Patterned Polymer Brushes and Mats" Macromolecules, 2011, 44, pp. 1876-1885.

Park et al., "Double textured cylindrical block copolymer domains via directional solidification on a topographically patterned substrate" Appl. Phys. Lett., 2001, 79, pp. 848-850.

Quirk et al., "Characterization of the Functionalization Reaction Product of Poly(styryl)lithium with Ethylene Oxide" Journal of Polymer Science: Part A: Polymer Chemistry, vol. 26, 2031-2037 (1988).

Russell et al., "Nonoscopic Templates from Oriented Block Copolymer Films" Advanced Materials (2000), 12, pp. 787-791.

Schulz et al., "Graft Polymers with Macromonomers. I. Synthesis from Methacrylate-Terminated Polystyrene" Journal of Applied Polymer Science, vol. 27, pp. 4773-4786 (1982).

Segalman et al., "Graphoepitaxy of Spherical Domain Block Copolymer Films" Advanced Materials (2001) 13, pp. 1152-1155.

Sundrani et al., "Guiding Polymers to Perfection: Macroscopic Alignment of Nanoscale Domains" Nano Letters (2004) 4, 273-276.

Sundrani et al., "Spontaneous Spatial Alignment of Polymer Cylindrical Nanodomains on Silicon Nitride Gratings" Macromolecules (2002) 35, 8531-8539.

Yerushalmi-Rozen et al., "Suppression of Rupture in Thin, Nonwetting Liquid Films" Science Feb. 11, 1994: vol. 263, pp. 793-795.

* cited by examiner

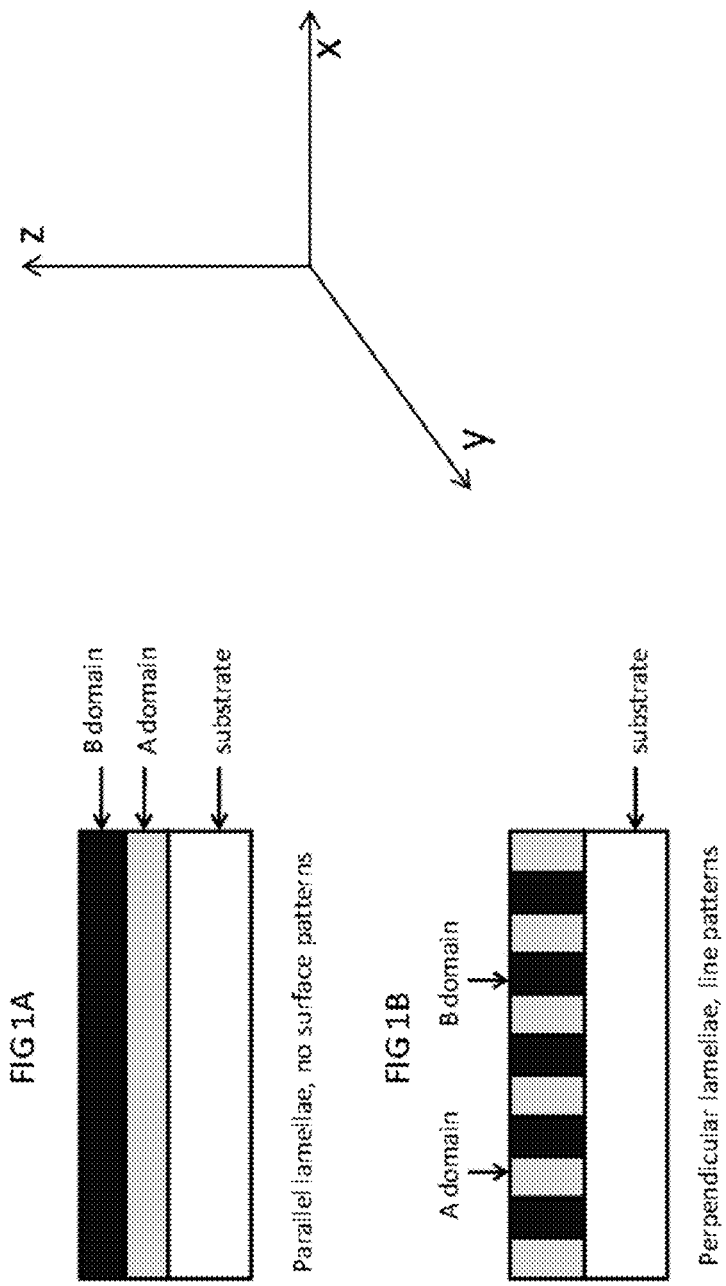

METHOD OF CONTROLLING BLOCK COPOLYMER CHARACTERISTICS AND ARTICLES MANUFACTURED THEREFROM

This US Non-Provisional Application claims the benefit of U.S. Provisional Application Ser. No. 61/922,209, filed 31 Dec. 2013, the entire contents of which are hereby incorporated by reference.

BACKGROUND

This disclosure relates to block copolymers and to brushes that are disposed upon a substrate and that can be used to control block copolymer characteristics. Controlling block copolymer characteristics can be used to manufacture semiconductors that have dimensions in the nanometer range.

Modern electronic devices are moving toward utilization of structures that have a periodicity of less than 40 nanometers. The ability to shrink the size and spacing of various features on a given substrate (e.g., gates in field effect transistors) is currently limited by the wavelength of light used to expose photoresists (i.e., 193 nm). These limitations create a significant challenge for the fabrication of features having a critical dimension (CD) of <50 nm.

Block copolymers have been proposed as one solution to formation of patterns with periodicity of less than 40 nanometers. Block copolymers form self-assembled nanostructures in order to reduce the free energy of the system. Nanostructures are those having average largest widths or thicknesses of less than 100 nanometers. This self-assembly produces periodic structures as a result of the reduction in free energy. The periodic structures can be in the form of domains, lamellae or cylinders. Because of these structures, thin films of block copolymers provide spatial chemical contrast at the nanometer-scale and, therefore, they have been used as an alternative low-cost nano-patterning material for generating periodic nanoscale structures.

Many attempts have been made to develop copolymers and processes for patterning. FIGS. 1A and 1B depict examples of lamellar forming block copolymers that are disposed upon a substrate. The block copolymer comprises a block A and a block B that are reactively bonded to each other and that are immiscible with each other. The alignment of the lamellar domains can be either parallel (FIG. 1A) or perpendicular (FIG. 1B) to the surface of a substrate surface upon which they are disposed. The perpendicularly oriented lamellae provide nanoscale line patterns, while there is no surface pattern created by parallel oriented lamellae.

Where lamellae form parallel to the plane of the substrate, one lamellar phase forms a first layer at the surface of the substrate (in the x-y plane of the substrate), and another lamellar phase forms an overlying parallel layer on the first layer, so that no lateral patterns of microdomains and no lateral chemical contrast form when viewing the film along the perpendicular (z) axis. When lamellae form perpendicular to the surface, the perpendicularly oriented lamellae provide nanoscale line patterns.

Cylinder forming block copolymers, on the other hand, provide nanoscale line patterns when the cylinders form parallel to the surface and hole or post patterns when the cylinders form perpendicular to the surface. Therefore, to form a useful pattern, control of the orientation of the self-assembled microdomains in the block copolymer is desirable. A schematic of the process using a sphere or cylinder forming block copolymer is shown in FIGS. 1(C) and 1(D). The block copolymer is applied to a substrate such as a trench treated with a brush layer. After annealing to form and align the domains, one block is selectively removed with an etch or development process to provide a mask that can be transferred into the substrate to create a nanoscale pattern with smaller features than in the original trench substrate.

The block copolymer is desirably annealed with heat (in the presence of an optional solvent), which allows for microphase separation of the polymer blocks A and B at a temperature above the glass transition temperature and below the order to disorder transition temperature. The annealed film can then be further developed by a suitable method such as immersion in a solvent/developer or by reactive ion etching which preferentially removes one polymer block and not the other to reveal a pattern that is commensurate with the positioning of one of the blocks in the copolymer.

The use of conventional block copolymers present difficulties in orientation control and long range ordering during the self assembly process. Diblock copolymers of poly (styrene) and poly(dimethylsiloxane) (PS-b-PDMS) offer promise for application in the patterning of nanoscale dimensions (especially sub-45 nm) using directed self assembly techniques. The etch selectivity between the polystyrene and poly(dimethylsiloxane) domains makes these materials useful for patterning. These materials are generally employed in so-called graphoepitaxy directed self-assembly (DSA) processes where physical confinement such as a hole or trench is used to align the block copolymer morphology. In Nano Lett. 2007, 7, 2046, Jung and Ross described the use of PS-b-PDMS in long trenches, resulting in aligned PDMS cylinders. After alignment in trenches and etching, the siloxane material forms a resist line pattern within the $SiO_2$ lines to multiply the feature density. Trench-patterned Si substrates with native oxide layers were first coated with a hydroxyl-end functional PDMS brush polymer (PDMS-OH) before application and annealing of the PS-b-PDMS. However, PDMS-OH is undesirable for a brush material due to the oxygen etch resistance of the PDMS, as the PDMS layer at the bottom of the trenches would make pattern transfer difficult. Alternatively, hydroxyl-end functional polystyrene brush polymers (PS-OH) have been used to treat trench substrates before application and annealing of the PS-b-PDMS.

Conventional wisdom in the art, however, is that the use of PS-b-PDMS block copolymers in such operations cannot effectively be thermally annealed due to the large incompatibility between the polystyrene and polydimethylsiloxane blocks. This is especially apparent in PS-b-PDMS materials that display a spacing of 30 nm or larger. For any block copolymer system, as the interdomain spacing increases, the material becomes more difficult to anneal to low defectivity. Accordingly, those in the art have developed a variety of alternative techniques for processing of block copolymers like poly(styrene)-b-poly(dimethylsiloxane) block copolymers. For example, Jung and Ross employed solvent vapor annealing to align the PS-b-PDMS, and in U.S. Patent Publication No. 2011/0272381; Millward, et al., disclose a solvent annealing method for processing diblock copolymer films such as poly(styrene)-b-poly(dimethylsiloxane).

In some DSA schemes, it is also desirable for the lines and spaces to have matching critical dimensions (CD). For example, it is possible to have at least two distinct populations of space CD after etch, one formed between the $SiO_2$ guide and the adjacent siloxane cylinder (the guide-adjacent space) and another between siloxane cylinders (the inter-cylinder space). It can be difficult to achieve matching space CDs as the guide-adjacent space CD is often smaller than the inter-cylinder space CD space CDs, particularly with block copolymers of large pitch ($L_0$>30 nm).

Notwithstanding, there remains a need for new combinations of block copolymer and brush compositions for use in patterning substrates. In particular, there remains a need for new copolymer compositions that enable patterning on intermediate length scales of 20 to 40 nm and that preferably exhibit a fast annealing profile with low defect formation. There is also a need to enable large guide adjacent space critical dimensions in trench guided directed self assembly applications.

It is therefore desirable to find combinations of block copolymers and brushes that can generate self-assembled films having domain sizes of less than 25 nanometers with a periodicity of less than 50 nanometers. Additionally, it is desirable to find combinations of block copolymers and brushes where the block copolymers contain a minority block with high etch resistance and a matrix block with comparatively low etch resistance, and the brushes have varying surface energy and coating thickness properties and low etch resistance compared to the etch resistant block. Additionally, it is desirable to find combinations of block copolymers and brushes where the block copolymers contain polymers with low silicon content and etch resistant silicon-containing polymers and the brushes contain polymers with low silicon content that are different from the organic polymer in the block copolymer.

SUMMARY

Disclosed herein is a composition comprising a brush polymer; where the brush polymer comprises a reactive moiety that is reacted to a substrate upon which it is disposed; and a block copolymer; where the block copolymer comprises a first block and a second block that are covalently bonded to each other; where the first block comprises a first polymer and a second block comprises a second polymer; where the first polymer comprises less than or equal to 10 atomic percent of polysiloxane; where the second polymer comprises at least 15 atomic percent of polysiloxane; where the brush polymer is chemically different from the first polymer and the second polymer; and where the first polymer is chemically different from the second polymer; and wherein the block copolymer is disposed upon the brush polymer.

Disclosed herein is a method comprising disposing a brush polymer upon a substrate; where the brush polymer comprises a reactive moiety that is reacted with the substrate; and disposing upon the brush a block copolymer; where the block copolymer comprises a first block and a second block that are covalently bonded to each other; where the first block comprises a first polymer and a second block comprises a second polymer; where the first polymer comprises less than or equal to 10 atomic percent of polysiloxane; where the second polymer comprises at least 15 atomic percent of polysiloxane; where the brush polymer is chemically different from the first polymer and the second polymer; and where the first polymer is chemically different from the second polymer.

BRIEF DESCRIPTION OF THE FIGURES

FIGS. 1(A) and 1(B) depict examples of lamellar forming block copolymers that are disposed upon a substrate;

DETAILED DESCRIPTION

Figure 1C:
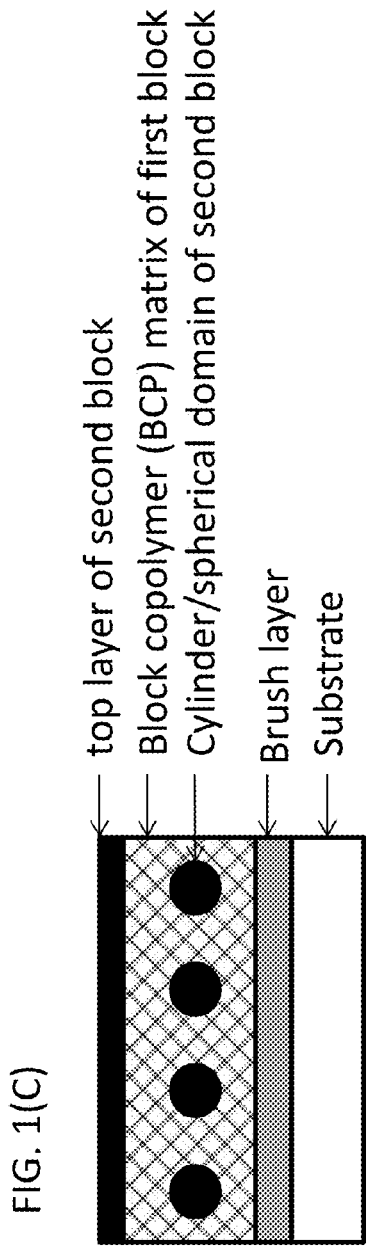
FIGS. 1(C) and 1(D) depict examples of sphere or cylinder forming block copolymers that are disposed upon a substrate.
Figure 1D:
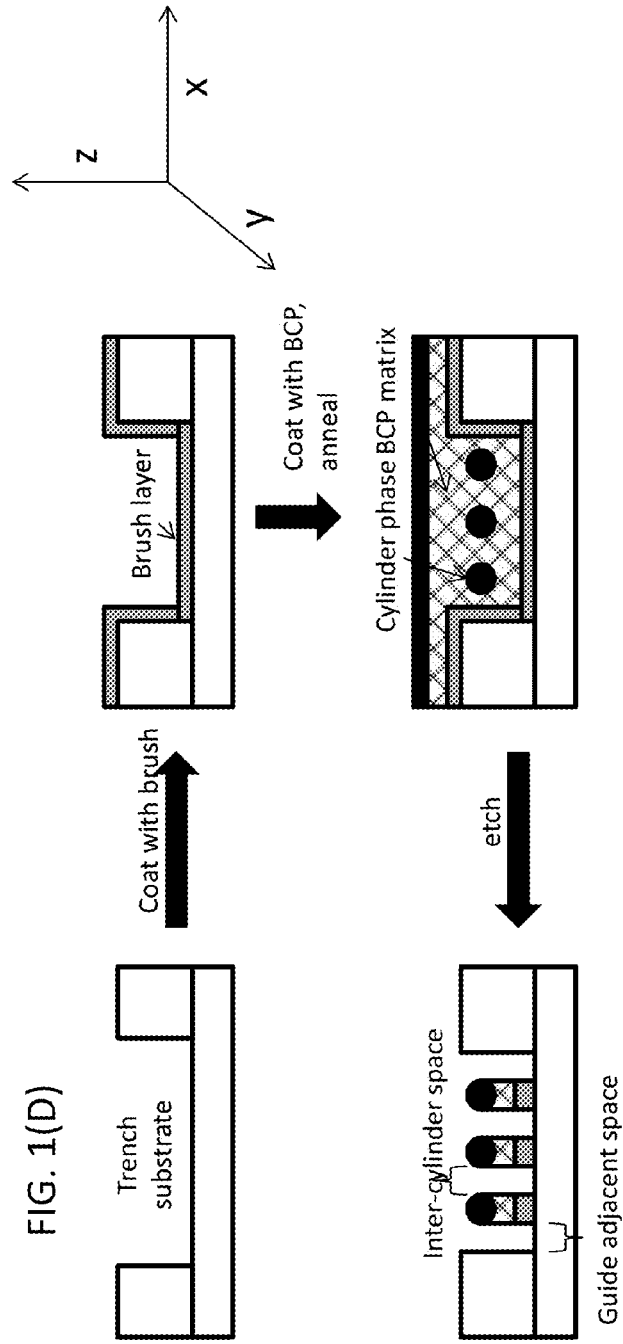

As used herein, "phase-separate" refers to the propensity of the blocks of block copolymers to form discrete microphase-separated domains, also referred to as "microdomains" or "nanodomains" and also simply as "domains". The blocks of the same monomer aggregate to form periodic domains, and the spacing and morphology of domains depends on the interaction, size, and volume fraction among different blocks in the block copolymer. Domains of block copolymers can form during application, such as during a spin-casting step, during a heating step, or can be tuned by an annealing step. "Heating", also referred to herein as "baking", is a general process wherein the temperature of the substrate and coated layers thereon is raised above ambient temperature. "Annealing" can include thermal annealing, thermal gradient annealing, solvent vapor annealing, or other annealing methods. Thermal annealing, sometimes referred to as "thermal curing" can be a specific baking process for fixing patterns and removing defects in the layer of the block copolymer assembly, and generally involves heating at elevated temperature (e.g., 150° C. to 400° C.), for a prolonged period of time (e.g., several minutes to several days) at or near the end of the film-forming process. Annealing, when performed, is used to reduce or remove defects in the layer (referred to as a "film" hereinafter) of microphase-separated domains.

The self-assembling layer comprising a block copolymer having at least a first block and a second block that forms domains through phase separation. "Domain", as used herein, means a compact crystalline, semi-crystalline, or amorphous region formed by corresponding blocks of the block copolymer, where these regions may be lamellar, cylindrical, or spherical and are formed orthogonal or perpendicular to the plane of the surface of the substrate and/or to the plane of a surface modification layer disposed on the substrate, or alternatively formed parallel or in plane with the substrate. In an embodiment, the domains may have an average largest dimension of about 1 to about 25 nanometers (nm), specifically about 5 to about 22 nm, and still more specifically about 7 to about 20 nm.

The term "$M_N$" used herein and in the appended claims in reference to a block copolymer of the present invention is the number average molecular weight of the block copolymer (in g/mol) determined according to the method used herein in the Examples.

The term "$M_W$" used herein and in the appended claims in reference to a block copolymer of the present invention is the weight average molecular weight of the block copolymer (in g/mol) determined according to the method used herein in the Examples.

The term "PDI" or "Ð" used herein and in the appended claims in reference to a block copolymer of the present invention is the polydispersity (also called polydispersity index or simply "dispersity") of the block copolymer determined according to the following equation:

$$PDI = \frac{M_W}{M_N}.$$

As used herein, PtBS-b-PDMS denotes block copolymers of poly(4-tert-butylstyrene) and polydimethylsiloxane. As used herein, PS-b-PDMS denotes block copolymers of polystyrene and polydimethylsiloxane.

The transition term "comprising" is inclusive of the transition terms "consisting of" and "consisting essentially of".

The term "and/or" is used herein to mean both "and" as well as "or". For example, "A and/or B" is construed to mean A, B or A and B.

Disclosed herein is a composition that comprises a combination of a block copolymer and a brush, where the block copolymer upon being disposed upon the brush produces an etch resistant cylindrical morphology (i.e., etch resistant cylinders) in a matrix. The brush comprises at least one polymer and at least one polymer contained in the brush is different in composition (chemical composition and structure) from the polymers contained in the block copolymer. The brush contains at least one moiety that permits it to be covalently bonded to the substrate.

In one embodiment, the block copolymer comprises a first block and a second block that are covalently bonded together, where at least one of the blocks is etch resistant, while the brush contains a reactive moiety that permits the brush to be bonded to a substrate. The brush polymer is chemically and structurally different from the first and the second blocks of the block copolymer. The reactive moiety is covalently bonded to the brush polymer. The first block of the copolymer generally contains less than 10 atomic percent silicon, specifically less than 5 atomic percent, more specifically less than 2 atomic percent, while the second block contains at least 10 atomic percent silicon, specifically at least 20 atomic percent silicon, and more specifically at least 30 atomic percent silicon. In an embodiment, the block copolymer comprises a polysiloxane, while the brush contains at least one moiety that permits it to be covalently bonded to the substrate.

The first block of the copolymer and the second block of the copolymer both have a narrow polydispersity index and as a result form block copolymers that display a high degree of periodicity. The copolymers have lamellar and/or cylindrical morphologies and can align perpendicular or parallel to the surface of a substrate upon which they are disposed, thus making them useful for advanced semiconductor patterning. These block copolymers can be used for creating features on a substrate (upon which they are disposed) that are less than or equal to about 50 nanometers, specifically less than or equal to about 40 nanometers. The block copolymer can be further treated via annealing to self-assemble into morphologies that display improved long range order. This feature advantageously permits the block-copolymer to be used as a photoresist with variable inter-domain spacings for different lithographic applications.

The block copolymer can be a multiblock copolymer. In one embodiment, the multiblocks can include diblocks, triblock, tetrablocks, and so on. The blocks can be part of a linear copolymer, a branched copolymer where the branches are grafted onto a backbone (these copolymers are also sometimes called "comb copolymers"), a star copolymer, or the like. In an exemplary embodiment, the block copolymer is a linear diblock copolymer.

The first block or the second block of the block copolymer can comprise a polymer derived from monomers of, for example, a vinyl aromatic monomer, an ethylenically unsaturated monomer, 1-butene, 1,3-butadiene, isoprene, vinyl acetate, dihydropyran, norbornene, maleic anhydride, alkylene oxides, lactones, lactams, epoxides, siloxane, or the like, or a combination comprising at least one of the foregoing monomers. When the first block contains a silicon-containing moiety, it is present in an amount of less than 10 atomic percent, specifically less than 5 atomic percent, and more specifically less than 2 atomic percent.

The vinyl aromatic monomer can be a styrene, an alkylstyrenes, or a combination thereof. The vinyl aromatic monomers are polymerized to produce the first block of the block copolymer. Examples of suitable alkylstyrenes are o-methylstyrene, p-methylstyrene, m-methylstyrene, α-methylstyrene, o-ethylstyrene, m-ethylstyrene, p-ethylstyrene, α-methyl-p-methylstyrene, 2,4-dimethylstyrene, monochlorostyrene, p-tert-butylstyrene, 4-tert-butylstyrene, or the like, or a combination comprising at least one of the foregoing alkylstyrene monomers. Other styrenes that can be used in the first block are hydroxy styrene, acetoxy styrene, or the like, or a combination thereof. An exemplary alkylstyrene monomer is 4-tert-butylstyrene. An exemplary first block of the block copolymer comprises polystyrene, poly(4-tertbutyl styrene), or a combination thereof.

The ethylenically unsaturated monomer can be an acrylate or a methacrylate. In one embodiment, the first block has a structure derived from an acrylate monomer represented by formula (1):

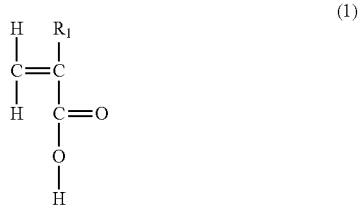

(1)

where $R_1$ is a hydrogen or an alkyl group having 1 to 10 carbon atoms. Examples of the first repeat monomer are acrylates and alkyl acrylates such as α-alkyl acrylates, methacrylates, ethacrylates, propyl acrylates, or the like, or a combination comprising at least one of the foregoing acrylates.

In one embodiment, the first block has a structure derived from a monomer having a structure represented by the formula (2):

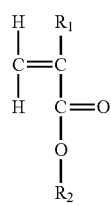

(2)

where $R_1$ is a hydrogen or an alkyl group having 1 to 10 carbon atoms and $R_2$ is a $C_{1-10}$ alkyl, a $C_{3-10}$ cycloalkyl, or a $C_{7-10}$ aralkyl group. Examples of the alkyl (α-alkyl) acrylates are methacrylate, ethacrylate, propyl acrylate, (meth)acrylate monomers, methyl (meth)acrylate, ethyl (meth)acrylate, n-propyl (meth)acrylate, isopropyl (meth) acrylate, n-butyl (meth)acrylate, isobutyl (meth)acrylate, n-pentyl (meth)acrylate, isopentyl (meth)acrylate, neopentyl (meth)acrylate, n-hexyl (meth)acrylate, cyclohexyl (meth) acrylate, isobornyl (meth)acrylate, hydroxyethyl (meth) acrylate, or the like, or a combination comprising at least one of the foregoing acrylates. The term "(α-alkyl)acrylate" implies that either an acrylate or α-alkyl)acrylate is contemplated unless otherwise specified.

In one embodiment, the first block is derived from a monomer that has at least one fluorine atom substituent and has a structure represented by the formula (3):

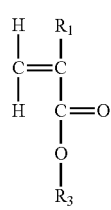

(3)

where $R_1$ is a hydrogen or an alkyl group having 1 to 10 carbon atoms and $R_3$ is a $C_{2-10}$ fluoroalkyl group. Examples of compounds having the structure of formula (3) are trifluoroethyl methacrylate, and dodecafluoroheptylmethacrylate. An exemplary ethylenically unsaturated monomer for the first block of the copolymer is methyl methacrylate. An exemplary first block of the block copolymer is polymethylmethacrylate.

The second block of the copolymer can comprise a polymer derived from monomers of, for example, a vinyl aromatic monomer, an ethylenically unsaturated monomer, 1-butene, 1,3-butadiene, isoprene, vinyl acetate, dihydropyran, norbornene, maleic anhydride, siloxane, or the like, or a combination comprising at least one of the foregoing monomers. The second contains a silicon-containing moiety present in an amount of at least 10 atomic percent silicon, specifically at least 20 atomic percent silicon and more specifically at least 30 atomic percent silicon.

The vinyl aromatic monomer of the second block can be a styrene, an alkylstyrene, or a combination thereof, bearing a silicon moiety. The vinyl aromatic monomers are polymerized to produce the first block of the block copolymer. Examples of suitable silicon-containing alkylstyrenes are 4-trimethylsilylstyrene, 4-(trimethylsilylmethyl)styrene, trimethyl(4-vinylphenoxy)silane, p-(t-butyldimethylsiloxy) styrene, styryl-based polyhedral oligosilsesquioxanes such as methacryloxypropylheptaisobutyl-T8-silsesquioxane, and the like.

In one embodiment, the second block has a structure derived from a monomer having a structure represented by the formula (4):

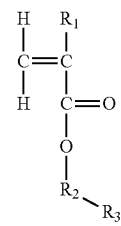

(4)

where $R_1$ is a hydrogen or an alkyl group having 1 to 10 carbon atoms and $R_2$ is a $C_{1-10}$ alkyl, a $C_{3-10}$ cycloalkyl, or a $C_{7-10}$ aralkyl group, and $R_3$ is a silicon containing group. Examples of these monomers include methacryloxymethyltris(trimethylsiloxy)silane, methacryloxypropylpentamethyldisiloxane, (methacryloxymethyl)bis(trimethylsiloxy) methylsilane, bis(trimethylsilyl)methyl methacrylate, (trimethylsilyl)methyl methacrylate, methacryloxypentamethyldisiloxane, methacryloxymethylphenethyltris(trimethylsiloxy)silane, methacryloxyethoxytrimethylsilane, (methacryloxymethyl)dimethylethoxysilane, methacryloxypropylheptaisobutyl-T8-silsesquioxane, (methacryloxymethyl)phenyldimethylsilane, In one embodiment, the second block has a structure derived from a monomer having a structure represented by the formula (5):

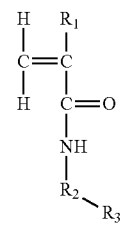

(5)

where $R_1$ is a hydrogen or an alkyl group having 1 to 10 carbon atoms and $R_2$ is a $C_{1-10}$ alkyl, a $C_{3-10}$ cycloalkyl, or a $C_{7-10}$ aralkyl group, and $R_3$ is a silicon containing group. An example of these monomers includes methacrylamidopropylbis(trimethylsiloxy)methylsilane.

In one embodiment, the second block is derived from a siloxane monomer having the structure of formula (6)

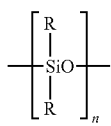

(6)

wherein each R is independently a $C_1$-$C_{10}$ alkyl, a $C_3$-$C_{10}$ cycloalkyl, a $C_6$-$C_{14}$ aryl, a $C_7$-$C_{13}$ alkylaryl or a $C_7$-$C_{13}$ arylalkyl. Combinations of the foregoing R groups can be present in the same monomer. The degree of polymerization n in the formula (4) can be 25 to 5,000, specifically 30 to 3,000, more specifically 50 to 1,000. The polysiloxane is the second block is generally present in an amount of greater than 15 atomic percent, specifically greater than 35 atomic percent, specifically greater than 50 atomic percent, and more specifically greater than 80 atomic percent, based on the total atomic weight of the second block. In another embodiment, the second block is derived from vinyl trimethylsilane or dimethylsilabutane.

In an exemplary embodiment, the second block comprises a polydimethylsiloxane having a number average molecular weight of 10,000 to 80,000 grams per mole, specifically 15,000 to 40,000 grams per mole.

The first block and the second block are present in amounts that permit the formation of cylinders (i.e., a cylindrical morphology) or spheres (i.e., a spherical morphology) of the second block in the block copolymer when it is disposed upon the brush. The second block comprises about 5 to about 40 volume percent of the total volume of the copolymer. If a cylindrical composition is desired, the second block comprises about 15 to about 35 volume percent, and more specifically about 20 to about 30 volume percent of the total volume of the copolymer. In an exemplary embodiment, the second block comprises about 25 volume percent of the total volume of the copolymer.

If spheres (i.e., the spherical morphology) are desired, then the second block comprises about 5 to about 20 volume percent, specifically about 8 to about 15 of the total volume of the copolymer.

The polydispersity index of the block copolymer is less than or equal to about 1.20, specifically less than or equal to about 1.15 and specifically less than or equal to about 1.10 when determined by size exclusion chromatography (SEC) with tetrahydrofuran (THF) as the mobile phase (at 35° C. and a flow rate of 1 mL/min).

The weight average molecular weight of the block copolymer is about 3 to about 150, specifically about 7.5 to about 120, specifically about 10 to about 100, and more specifically about 15 to about 80 kilograms per mole as determined using multi-angle laser light scattering gel permeation chromatography and the polydispersity index. In an exemplary embodiment, it is desirable for the block copolymer to have a weight average molecular weight of about 3 to about 120 kilograms per mole.

The block copolymer has an interdomain spacing as measured by small angle x-ray scattering of less than or equal to about 60 nanometers, specifically less than or equal to about 50 nanometers, more specifically less than or equal to about 40 nanometers, and more specifically less than or equal to about 36 nanometers.

In an exemplary embodiment, the block copolymer is a poly(styrene)-block(b)-poly(alkylsiloxane), a poly(alkylstyrene)-b-poly(alkylsiloxane), or a combination thereof. In an exemplary embodiment, the poly(styrene)-block(b)-poly (alkylsiloxane) is poly(styrene)-b-poly(dimethylsiloxane), while the poly(alkylstyrene)-b-poly(alkylsiloxane) is poly(t-butylstyrene)-b-poly(dimethylsiloxane).

The poly(styrene)-b-poly(dimethylsiloxane) block copolymer or the poly(t-butylstyrene)-b-poly(dimethylsiloxane) block copolymer disclosed herein comprises a poly(styrene)-b-poly(dimethylsiloxane) block copolymer component (hereinafter PS-b-PDMS) or comprises a poly(t-butylstyrene)-b-poly(dimethylsiloxane) (hereinafter PtBS-b-PDMS), wherein the block copolymer component is selected from a single PS-b-PDMS or PtBS-b-PDMS block copolymer or from a blend of at least two different PS-b-PDMS or PtBS-b-PDMS block copolymers; wherein the average molecular weight of the PS-b-PDMS or PtBS-b-PDMS block copolymer component is 2 to 1,000 kg/mol, specifically 5 to 100; more specifically 6 to 60 kg/mol.

In one embodiment, the PS-b-PDMS or PtBS-b-PDMS block copolymer component is a single PS-b-PDMS or PtBS-b-PDMS block copolymer (not a blend of two block copolymers); wherein the average molecular weight (as defined hereinabove) of the PS-b-PDMS or PtBS-b-PDMS copolymer is 2 to 1,000 kg/mol (specifically 5 to 100 kg/mol; more specifically 6 to 60).

In another embodiment, the PS-b-PDMS or PtBS-b-PDMS component is a blend of at least two different PS-b-PDMS or PtBS-b-PDMS block copolymers; wherein the average molecular weight (as defined hereinabove) of the blend of PS-b-PDMS or PtBS-b-PDMS block copolymers is 25 to 1,000 kg/mol, specifically 30 to 1,000 kg/mol; more specifically 30 to 100; most specifically 30 to 60 kg/mol. In an exemplary embodiment, the PS-b-PDMS or PtBS-b-PDMS block copolymer component is a blend of at least two different PS-b-PDMS or PtBS-b-PDMS block copolymers; wherein the at least two different PS-b-PDMS or PtBS-b-PDMS block copolymers are selected from PS-b-PDMS or PtBS-b-PDMS block copolymers having a number average molecular weight, $M_n$, of 1 to 1,000 kg/mol; a polydispersity, PD, of 1 to 3, specifically 1 to 2, most specifically 1 to 1.2; and, a poly(dimethylsiloxane) weight fraction, $Wf_{PDMS}$, of 0.18 to 0.8, specifically 0.18 to 0.35 when the desired morphology comprises polydimethylsiloxane cylinders in a polystyrene matrix. It is to be noted that a block copolymer blend can comprise a PS-b-PDMS block copolymer and a PtBS-b-PDMS block copolymer.

The PS-b-PDMS or PtBS-b-PDMS block copolymer desirably has an overall molecular weight and polydispersity amenable to further processing. In an embodiment, the block copolymer has a weight-average molecular weight (Mw) of 10,000 to 200,000 g/mol. Similarly, the block copolymer has a number averaged molecular weight (Mn) of 5,000 to 200,000. The block copolymer can also have a polydispersity (Mw/Mn) of 1.01 to 6. In an embodiment, the polydispersity of the block copolymer is 1.01 to 1.5, specifically 1.01 to 1.2, and still more specifically 1.01 to 1.1. Molecular weight, both Mw and Mn, can be determined by, for example, gel permeation chromatography using a universal calibration method, and calibrated to polystyrene standards.

The PS-b-PDMS or PtBS-b-PDMS block copolymer used in the method of the present invention, optionally further comprises a solvent. Solvents suitable for use in the PS-b-PDMS or PtBS-b-PDMS block copolymer include liquids that are able to disperse the PS-b-PDMS or PtBS-b-PDMS block copolymer component into particles or aggregates having an average hydrodynamic diameter of less than 50 nanometers (nm) as measured by dynamic light scattering. Specifically, the solvent used is selected from propylene glycol monomethyl ether acetate (PGMEA), ethoxyethyl propionate, anisole, ethyl lactate, 2-heptanone, cyclohexanone, amyl acetate, γ-butyrolactone (GBL), n-methyl-pyrrolidone (NMP) and toluene. More specifically, the solvent used is selected from propylene glycol monomethyl ether acetate (PGMEA) and toluene. Most specifically, the solvent used is toluene or propylene glycol monomethyl ether acetate.

The PS-b-PDMS or PtBS-b-PDMS block copolymer used in the method of the present invention, optionally further comprises an additive. Preferred additives for use in the PS-b-PDMS or PtBS-b-PDMS block copolymer include surfactants and antioxidants. Additional polymers (including homopolymers and random copolymers); surfactants; antioxidants; photoacid generators; thermal acid generators; quenchers; hardeners; adhesion promoters; dissolution rate modifiers; photocuring agents; photosensitizers; acid amplifiers; plasticizers; and cross linking agents. Preferred additives for use in the PS-b-PDMS or PtBS-b-PDMS block copolymer include surfactants and antioxidants.

As noted above, the brush is disposed upon the substrate and comprises a reactive species that can covalently bond the brush to the substrate. The brush can be chosen such that it has a lower or higher surface energy than the block copolymer. By selecting a particular combination of a brush and a block copolymer, the interdomain spacing between the etch resistant cylinders can be controlled. In addition, when disposed in a trench, the spacing between the trench walls and a surface of the etch resistant cylinders can be controlled. Control of the distance between the trench walls and the cylinder surface and the distance between the cylinders can be used to produce high quality semiconductors for use in electronic devices.

The brush generally comprises a polymer or a copolymer comprising the reactive species. The polymer or copolymer used in the brush is different in chemical composition from all of the polymers that are contained in the block copolymer. The copolymer used in the brush can be a block copolymer or a random copolymer. In an embodiment, the brush polymer has the structure of formula (7 A) or (7 B) below:

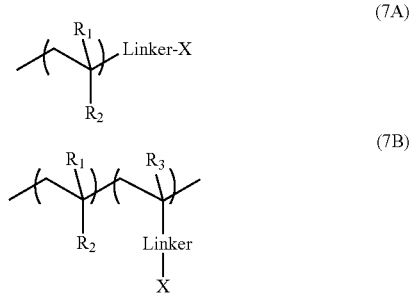

where the reactive species X can, for example, be a hydroxyl group, a thiol group, an amine group, a carboxyl group, a silane group or an alkoxy groups, $R_1$, $R_2$ and $R_3$ can be the same or different and can be a hydrogen, a $C_{1-10}$ alkyl group, a $C_{1-10}$ alkyl ester group, a $C_{3-10}$ cycloalkyl ester group, a $C_{7-10}$ aralkyl ester group, a $C_6$-$C_{14}$ aryl, a $C_7$-$C_{13}$ alkylaryl or a $C_7$-$C_{13}$ arylalkyl group. Other groups may also be used for $R_1$, $R_2$ and $R_3$.

Examples of polymers and copolymers that can be used in the brush are polystyrene, polysiloxane, polymethylmethacrylate, polyacrylate, polyvinylacetate, polydienes, polyethers including poly(alkylene oxides) such as poly (ethylene oxide), polypropylene oxide), poly(butylene oxide), or random or block copolymers of these; poly((meth)acrylates), polystyrenes, polyesters, polyamides, polyorganosiloxanes, polyorganogermanes, or the like.

In one embodiment, the blocks of the block copolymer comprise as monomers $C_{2-30}$ olefinic monomers, (meth) acrylate monomers derived from $C_{1-30}$ alcohols, inorganic-containing monomers including those based on iron, silicon, germanium, tin, aluminum, titanium, or a combination comprising at least one of the foregoing monomers. In a specific embodiment, exemplary monomers for use in the blocks can include, as the $C_{2-30}$ olefinic monomers, ethylene, propylene, 1-butene, 1,3-butadiene, isoprene, vinyl acetate, dihydropyran, norbornene, maleic anhydride, styrene, 4-hydroxy styrene, 4-acetoxy styrene, 4-methylstyrene, or a-methylstyrene; and can include as (meth)acrylate monomers, methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, isopentyl (meth)acrylate, neopentyl (meth)acrylate, n-hexyl (meth) acrylate, cyclohexyl (meth)acrylate, isobornyl (meth)acrylate, or hydroxyethyl (meth)acrylate. Combinations of two or more of these monomers can be used in the brush so long as polymer(s) derived from any one of these monomers is not contained in the block copolymer that is disposed upon the brush.

Exemplary blocks used in the brush styrene (i.e., polystyrene blocks), or (meth)acrylate homopolymeric blocks such as poly(methylmethacrylate); exemplary random blocks include, for example, blocks of styrene and methyl methacrylate (e.g., poly(styrene-co-methyl methacrylate)), randomly copolymerized; and an exemplary alternating copolymer block can include blocks of styrene and maleic anhydride which is known to form a styrene-maleic anhydride diad repeating structure due to the inability of maleic anhydride to homopolymerize under most conditions (e.g., poly(styrene-alt-maleic anhydride)). It will be understood that such blocks are exemplary and should not be considered to be limiting.

Exemplary block copolymers that are contemplated for use in the brush include diblock or triblock copolymers such as poly(styrene-b-vinyl pyridine), poly(styrene-b-butadiene), poly(styrene-b-isoprene), poly(styrene-b-methyl methacrylate), poly(styrene-b-alkenyl aromatics), poly(isoprene-b-ethylene oxide), poly(styrene-b-(ethylene-propylene)), poly(ethylene oxide-b-caprolactone), poly(butadiene-b-ethylene oxide), poly(styrene-b-t-butyl (meth)acrylate), poly (methyl methacrylate-b-t-butyl methacrylate), poly(ethylene oxide-b-propylene oxide), poly(styrene-b-tetrahydrofuran), poly(styrene-b-isoprene-b-ethylene oxide), poly(styrene-b-dimethylsiloxane), poly(styrene-b-trimethylsilylmethyl methacrylate), poly(methyl methacrylate-b-dimethylsiloxane), poly(methyl methacrylate-b-trimethylsilylmethyl methacrylate), or the like, or a combination comprising at least one of the foregoing block copolymers.

Exemplary brushes are hydroxyl terminated polystyrene, hydroxyl terminated polydimethylsiloxane, hydroxyl terminated poly(methylmethacrylate-random-trifluoroethylmethacrylate) (P(MMA-r-TFEMA)-OH), and hydroxyl terminated poly(methylmethacrylate-random-dodecafluoroheptylmethacrylate) (P(MMA-r-DFHMA)-OH).

In one embodiment, in using the composition comprising the brush and the block copolymer, the brush is first disposed on the substrate. The substrate may be cleaned with a solvent prior to disposing the brush on the substrate. Both the brush and block copolymer may be subjected to purification steps prior to being disposed upon the substrate. Purification may involve centrifugation, filtration, distillation, decantation, evaporation, treatment with ion exchange beads, and the like. Upon disposing the brush upon the substrate, the substrate is heated to facilitate a reaction between the brush and the substrate.

In one embodiment, the brush may be dispersed/dissolved in a solvent prior to being disposed upon the substrate. A list of solvents is provided above and one or more of these solvents may be used to dissolve the brush. Other solvents not found in this list may also be used. The brush may be disposed upon the substrate by spin coating, dip coating, spray coating, electrostatic painting, using a doctor blade, and the like.

After disposing the brush on the substrate, the block copolymer is disposed upon the brush. The block copolymer may have a higher surface energy or a lower surface energy than the brush. By selecting that appropriate combination of brush and block copolymer, the spacing between trench walls and cylindrical domains may be controlled. The block copolymer may be disposed upon the brush by spin coating, dip coating, spray coating, electrostatic painting, using a doctor blade, and the like.

The substrate with the brush and the block copolymer disposed thereon may be subjected to annealing. The block copolymer is heated to a temperature of up to 400° C. for up to 4 hours to both remove solvent and form the domains in an annealing process. In an exemplary embodiment, the block copolymer is disposed upon the substrate and heated to a temperature of 200 to 400° C., specifically 250 to 340° C. for 0.5 minutes to 2 hours, specifically 1 to 10 minutes. The annealing of the block copolymer can be used to vary the interdomain spacing (i.e., the periodicity) of the cylindrical and/or lamellar domains. The size of the domains can also be varied by the temperature and time of the annealing.

Upon annealing, the cylindrical or spherical domains of the block copolymer form on the substrate with the first block in contact with the brush on the substrate, and the second block forms a second domain in the form of a cylinder or sphere in the matrix of the first domain. Cylinder domains are therefore aligned parallel to the plane of the substrate. One of the domains of the block copolymer is then etched away. A relief pattern may then formed by removing either the first or second domain to expose an underlying portion of the brush layer or underlying substrate. In an embodiment, removing is accomplished by a wet etch method, developing, or a dry etch method using a plasma such as an oxygen plasma. The block copolymer with at least one domain removed is then used as a template to decorate or manufacture other surfaces that may be used in fields such as electronics, semiconductors, and the like.

The block copolymer morphology can be used in combination with a graphoepitaxy directed self assembly scheme using a patterned surface to control the placement and orientation of the domains on the substrate. Patterned substrates include topographic features such as line and space patterns, trenches, holes, posts, and the like, and can be formed to direct the self-assembly to give a regular pattern with a dense pitch, i.e., a ratio of line width to space width of 1:1 or more (e.g., 1.1:1, 1.2:1, 1.5:1, 2:1, and the like), a semi-dense pitch of less than 1:1 (e.g., 1:1.5) or a sparse pattern having a pitch of 1:2 or less (e.g., 1:3, 1:4, and the like). The brush polymer can be applied to the bottom and/or sidewalls of these topographic features of the graphoepitaxy substrates to control domain alignment and feature dimensions.

Advantageously, use of lines or dashes with high line-edge roughness and line-width roughness is tolerated by this patterning method, as the domains upon forming can correct any defects of alignment in a "self-healing" mechanism during annealing.

In one embodiment, at least one microphase-separated domain is selectively removed to generate a topographical pattern, followed by pattern transfer from the topographic pattern to another substrate by a reactive ion etch process. The other substrate may be a semiconductor substrate. The above methods and structures may be used in the manufacture of semiconductor devices including memory devices requiring dense line/space patterns such as synchronous dynamic random access memory (SDRAM) or dense features for data storage such as in hard drives.

The methods as disclosed allow for formation of self-assembling preparation of nanoscale structural features, and directional control of the nanopatterned features, by sequential deposition of the orientation control surface modification layer using often used solution coating techniques, providing greater control of the desired feature patterns, into different post-patterning processes useful for obtaining different topographies by substrate etch, and for the preparation of a wide variety of features in a wide variety of compositional or topographic substrates.

The composition and method of manufacturing disclosed herein are detailed in the following non-limiting examples.

EXAMPLES

Example 1

This example demonstrates the manufacturing of brushes that are disposed on a substrate. A block copolymer is then disposed upon the brushes. The brushes were hydroxyl terminated polydimethylsiloxane (OH terminated PDMS), hydroxyl terminated polystyrene (OH terminated PS), OH end functional poly(methylmethacrylate-random-trifluoroethylmethacrylate) (P(MMA-r-TFEMA)-OH), OH end functional poly(methylmethacrylate-random-dodecafluoroheptylmethacrylate)-OH brush (P(MMA-r-DFHMA)-OH). The synthesis or procuring of these materials is detailed below.

Synthesis of OH-Terminated PDMS

The Si—H terminated PDMS (4.0 g) and allyl alcohol (0.29 g, 4.9 mmol, 18 eq. based on silane) were combined in a 20 mL vial. The vial was placed under a blanket of N2, and a small scoop of 5% Pt/C was added to it. The vial was capped and heated to 110° C. for 15 hrs in a heating block. The crude reaction mixture was filtered through a frit, and 1 μm filter using hexanes to wash all the PDMS through. The polymer was then evacuated at 60° C. to remove hexanes and excess allyl alcohol to yield the desired PDMS-OH.

Procuring of OH Terminated Polystyrene

Hydroxyl end functional polystyrene with Mn=10 kg/mol was purchased from Scientific Polymer, and hydroxyl end functional polydimethylsiloxane with Mn=10 kg/mol was purchased from Dow Corning and used as received.

Synthesis of OH end functional poly(methylmethacrylate-random-trifluoroethylmethacrylate (P(MMA-r-TFEMA)-OH)

A Schlenk flask was equipped with a magnetic stirring bar, 4,4'-di-tert-butyl-2,2'-bipyridyl (0.537 g), Cu(I)Br (0.144 g), methyl methacrylate (7.00 g), trifluoroethyl methacrylate (3.00 g), and toluene (10 g). The solution was sparged with argon for 15 minutes and then placed in a preheated oil bath at 90° C. Once the solution had come to equilibrium, the initiator (2-hydroxyethyl 2-bromo-2-methylpropanoate) (0.211 g) was added via syringe and the reaction was stirred at 90° C. After the polymerization was quenched, the mixture was diluted with THF and stirred with ion exchange beads to remove the catalyst. Once the solution was clear, it was filtered, concentrated to 50 wt %, and precipitated into excess cyclohexane. The polymer was collected and dried in a vacuum oven at 60° C. overnight. $^1$H NMR showed the polymer to have a composition of 69 wt % methyl methacrylate and 31 wt % trifluoroethyl methacrylate. Gel-permeation chromatography revealed a Mn=13.9 kg/mol relative to polystyrene (PS) standards and Mw/Mn=1.20.

Synthesis of —OH end functional poly(methylmethacrylate-random-dodecafluoroheptylmethacrylate)-OH brush (P(MMA-r-DFHMA)-OH)

A random copolymer hydroxyl end functional brush comprising copoly(methyl methacrylate-random-do decafluoroheptylmethacrylate) was manufactured with a reactive alcohol end group by adding to a Schlenk flask equipped with a magnetic stirring bar, 4,4'-di-tert-butyl-2,2'-bipyridyl (0.537 g), Cu(I)Br (0.143 g), methyl methacrylate (1.02 g), dodecafluoroheptylmethacrylate (9.05 g), and toluene (10 g) were added. The solution was sparged with argon for 15 minutes and then placed in a preheated oil bath at 90° C. Once the solution had come to equilibrium, the initiator (2-hydroxyethyl 2-bromo-2-methylpropanoate) (0.210 g) was added via syringe and the reaction was stirred at 90° C. After the polymerization was quenched, the mixture was diluted with THF and stirred with ion exchange beads to remove the catalyst. Once the solution was clear, it was filtered, concentrated to 50 wt %, and precipitated into excess cyclohexane. The polymer was collected and dried in a vacuum oven at 60° C. overnight. $^1$H NMR showed the polymer to have a composition of 7 wt % methyl methacrylate and 93 wt % dodecafluoroheptylmethacrylate. Gel-permeation chromatography revealed a Mn=14.9 kg/mol relative to PS standards and Mw/Mn=1.27.

Substrate Preparation

Four different types of brushes were disposed upon different substrates. The brushes had a single hydroxyl functionality at the chain end and included a polystyrene-OH brush (PS-OH), a polydimethylsiloxane-OH brush (PDMS-OH), a poly(methylmethacrylate-random-trifluoroethylmethacrylate)-OH brush (P(MMA-r-TFEMA)-OH) that comprises 31 weight percent trifluoroethylmethacrylate and a poly(methylmethacrylate-random-dodecafluoroheptylmethacrylate)-OH brush (P(MMA-r-DFHMA)-OH) that comprises 93 weight percent dodecafluoroheptylmethacrylate.

The surface of a silicon substrate having a native oxide layer was modified by spin coating thereon a 1.5 wt % (solids) solution of the desired hydroxyl-terminated polymer bush in toluene at 3,000 rpm for 1 minute. The substrate was then placed on a hotplate set at 150° C. for 1 minute. The substrate was then placed on a hot plate set at 250° C. under a nitrogen atmosphere for 20 minutes to attach the deposited brush layer. The substrate was then rinsed with toluene to wash away any unattached polymer by first soaking the substrate in toluene for 1 minute and then spin drying at 3,000 rpm for 1 minute. The substrate was then baked on a hotplate set at 110° C. for one minute.

The hydroxyl-end functional brush polymers were then cast onto a silicon substrate with native oxide, baked at 250° C. for 2 min, rinsed with casting solvent, baked at 130° C. for 60 s to remove residual solvent, and then the surface energy was determined for each brush using a contact angle determination method. The contact angle was measured on a contact angle goniometer by the Sessile Drop method using water (18 ohm deionized water), methylene iodide ($CH_2I_2$), and diethylene glycol. Surface energy including both polar and dispersive components was calculated from the contact angles of each of these solvents using the Owens-Wendt method. The results are reported in units of millijoules per square meter ($mJ/m^2$) and are collected in Table 1.

TABLE 1

| Substrate Surface | Surface Energy ($mJ/m^2$)) |
|---|---|
| PS-OH brush | 40.9 |
| P(MMA-r-TFEMA)-OH brush (31% PTFEMA), | 31.7 |
| P(MMA-r-DFHMA)-OH brush (93% PDFHMA) | 20.9 |
| PDMS-OH brush | 17.8 |

Example 2

Synthesis of comparative composition (polystyrene-block-polydimethylsiloxane) (PS-b-PDMS)

Into a 500 mL round bottom reactor under an argon atmosphere was added cyclohexane (56 g) and styrene (16.46 g). The contents of the reactor were then warmed to 40° C. A 7.49 g shot of a 0.06 M solution of sec-butyllithium in cyclohexane was then rapidly added to the reactor via cannula, causing the reactor contents to turn yellow-orange. The reactor contents were allowed to stir for 30 minutes. A small portion of the reactor contents was then withdrawn from the reactor into a small round bottomed flask containing anhydrous methanol for gel permeation chromatography analysis of the polystyrene block formed. Then 22.39 g of a 21 wt % solution of freshly sublimed hexamethylcyclotrisiloxane in cyclohexane was transferred to the reactor. The reactor contents were allowed to react for 20 hours. Then dry tetrahydrofuran (93 mL) was added to the reactor and the reaction was allowed to proceed for 7 hours. Chlorotrimethylsilane (1 mL) was then added to the reactor to quench the reaction. The product was isolated by precipitating into 1 L of methanol and filtering. After washing with additional methanol, the polymer was redissolved in 150 mL of methylene chloride, washed twice with deionized water and then reprecipitated into 1 L of methanol. The polymer was then filtered and dried overnight in a vacuum oven at 60° C., yielding 19.7 g. The poly(styrene)-b-poly(dimethyl siloxane) block copolymer product exhibited a number average molecular weight, (MO, of 40 kg/mol; a polydispersity, PDI, of 1.11 and a 22 wt % PDMS content (as determined by $^1$H NMR).

Thin Film Formation

A PS-b-PDMS block copolymer with Mn=40 kg/mol and 22 wt % PDMS was dissolved in propylene glycol methyl ether acetate (Dowanol® PMA from the Dow Chemical Company) to form a 1.8 wt % solution. The synthesis of the PS-b-PDMS block copolymer is detailed in Example 4 below. The solution was then hand filtered using a 0.2 µm Whatman syringe filter. The filtered solution was then spin coated at 3,061 rpm onto a poly(styrene) brushed substrate to obtain a deposited film thickness of 38.3 nm. The substrate was then baked on a hotplate set at 150° C. for 1 minute. The deposited film was then annealed by placing the substrate on a hotplate set at 290° C. for one hour under a nitrogen atmosphere containing <6 ppm oxygen.

A surface wetting layer of PDMS formed on the annealed film at the atmosphere-film interface. The annealed film was then treated using two consecutive reactive ion etching (RIE) steps using a PlasmaTherm 790i RIE to reveal the block copolymer morphology of the deposited PS-b-PDMS film. First, a short $CF_4$ plasma (10 mT, 50 W) RIE treatment (8 seconds post plasma stabilization) was used to punch through the surface wetting layer of PDMS. Then, an $O_2$ plasma RIE treatment (25 seconds post plasma stabilization) was employed to remove the polystyrene and convert the PDMS to $SiO_x$.

Figure 5:
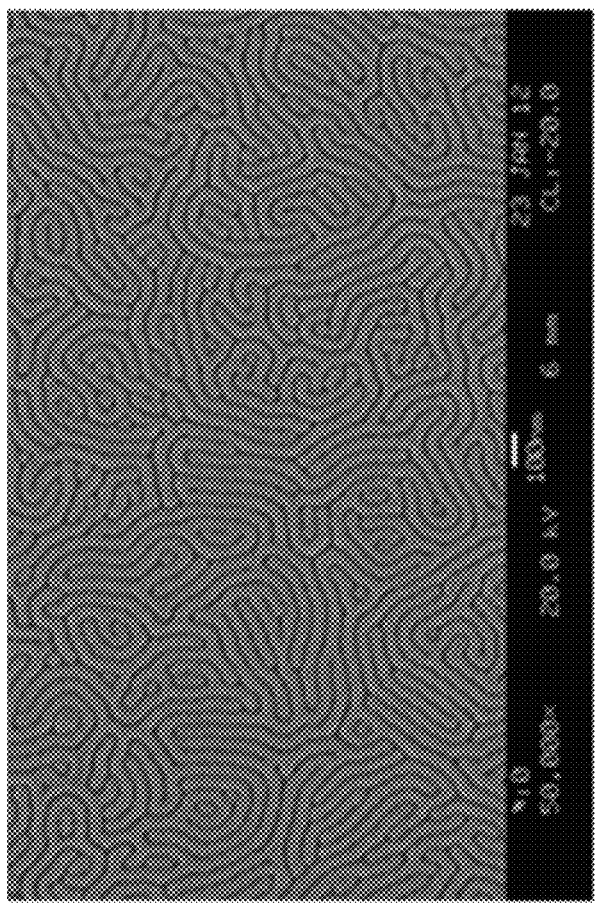
FIG. 5 is a scanning electron photomicrograph for the comparative composition (PS-b-PDMS) depicting the resulting pattern of oxidized PDMS lines having a pitch of 30 nm with short, choppy lines of a relatively low correlation length.

The plasma treated film was then examined by Scanning Electron Microscopy (SEM). The test sample was mounted on the SEM stage using double sided carbon tape and cleaned by blowing nitrogen prior to analysis. Images of the test sample were collected at 50,000× magnification and working distances between 4 and 8. As seen from the SEM image in the FIG. 5, the resulting pattern of oxidized PDMS lines has a pitch of 30 nm with short, choppy lines of relatively low correlation length.

Example 3

This example details film formation and thermal annealing of PtBS-PDMS on PS-brushed silicon substrate.

Synthesis of PtBS-b-PDMS
(poly-tert-butylstyrene-b-polydimethylsiloxane)
materials PtBS-b-PDMS (Mn=41.4 kg/mol, 30.3 wt % PDMS) was prepared by first adding cyclohexane (234 g) and t-butylstyrene (55.7 g) to a 1000 mL round bottom reactor under an argon atmosphere. The contents of the reactor were then warmed to 40° C. A 1.84 g shot of a 0.745 M solution of sec-butyllithium in cyclohexane was then rapidly added to the reactor via cannula, causing the reactor contents to turn orange. The reactor contents were allowed to stir for 60 minutes. Then, 0.97 g of 2,2,5,5-tetramethyl-1,2,5-oxadisilolane in cyclohexane (2 mL) was added via cannula, and after a few minutes, a small portion of the reactor contents was then withdrawn from the reactor into a small round bottomed flask containing anhydrous methanol for gel permeation chromatography analysis of the poly(t-butylstyrene) block formed. A solution of freshly sublimed hexamethylcyclotrisiloxane (32.34 g) in cyclohexane (33 mL) was transferred to the reactor, followed by dry tetrahydrofuran (212 g), and the reaction was then allowed to proceed for 16 hours. Chlorotrimethylsilane (1 mL) was then added to the reactor to quench the reaction. The product was isolated by precipitating into 1 L of methanol and filtering. After washing with additional methanol, the polymer was redissolved in 300 mL of methylene chloride, washed twice with deionized water and then reprecipitated into 1 L of methanol. The polymer was then filtered and dried overnight in a vacuum oven at 60° C., yielding 70 g. The PtBS-PDMS block copolymer product exhibited a number average molecular weight, $M_n$, of 41.4 kg/mol; a polydispersity, PDI, of 1.13, and 30.3 wt % PDMS content (as determined by $^1$H NMR).

Two additional PtBS-b-PDMS materials were similarly prepared according to the above procedure, one having Mn=51,600 grams per mole and 28 wt % PDMS and another with Mn=62,500 grams per mole and 28 wt % PDMS.

Thin Film Formation

A film of PtBS-b-PDMS with Mn=51,600 grams per mole was coated from a solution of PGMEA onto a silicon substrate treated with a polystyrene brush after filtering the solution through a 0.2 μm Whatman syringe filter to give a film thickness of 49.6 nm. The substrate was then baked on a hotplate set at 150° C. for 1 minute. The deposited film was then annealed by placing the substrate on a hotplate set at 290° C. for one hour under a nitrogen atmosphere containing <6 ppm oxygen.

Figure 6:
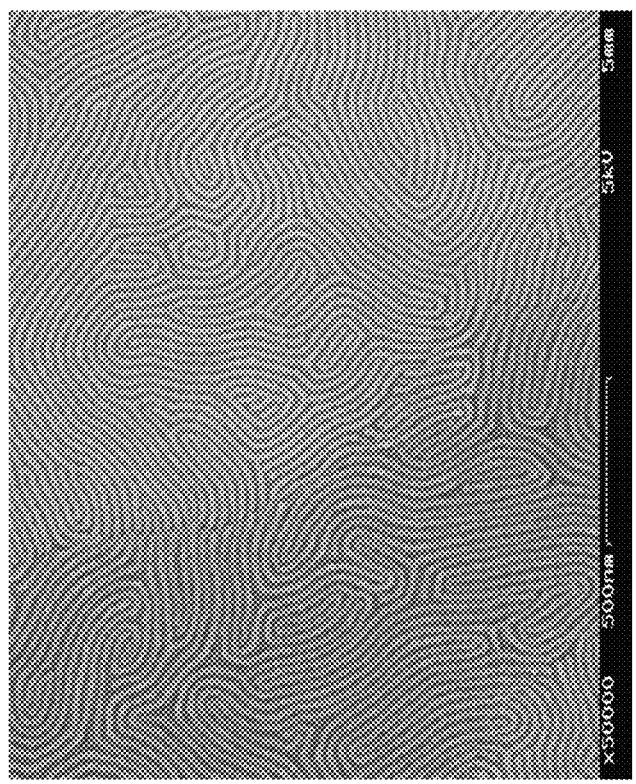
FIG. 6 is a scanning electron photomicrograph depicting a pattern of oxidized PDMS lines (in the PtBS-b-PDMS) sample with straighter lines with longer correlation length despite having a larger pitch, 33 nm, than that observed in the PS-PDMS film, which showed a pitch of 30 nm.

Prior to taking images on a scanning electron microscope (SEM), the annealed sample was first treated with a $CF_4$ plasma flash to remove the surface wetting layer followed by an $O_2$ plasma etch to remove the organic PtBS matrix. SEM images of the sample were taken at a magnification of 50,000× using an Amray 1910 scanning electron microscope. Pitch and correlation length (CL) were determined based on the SEM images using Igor Pro. The SEM image, shown in FIG. 6, revealed a pattern of oxidized PDMS lines with a larger pitch, 33 nm, than observed in the PS-PDMS film, which showed 30 nm. For a given composition of block copolymer, as the pitch increases, the ability to anneal to low defect states decreases due to the stronger segregation strength (higher χN). Despite having a larger pitch, the pattern provided by this PTBS-b-PDMS are much longer and straighter with higher correlation length than those observed in the PS-b-PDMS sample annealed with the same thermal dose (i.e. the combination of time and temperature). This reveals an advantage of PtBS-b-PDMS over PS-b-PDMS for annealing block copolymers to low defect states at large pitch, for example pitches >30 nm, in reasonable amounts of time.

Example 4

This example was conducted to demonstrate the use of poly(t-butylstyrene)-block-polydimethylsiloxane (PtBS-b-PDMS) copolymers on a substrate that is coated with brushes. Four different types of brushes were disposed upon the substrate. A comparative composition of (polystyrene-block-polydimethylsiloxane) (PS-b-PDMS) was also disposed on the brushes on the substrate. The brushes had a single hydroxyl functionality at the chain end and included a polystyrene-OH brush (PS-OH), a polydimethylsiloxane-OH brush (PDMS-OH), a poly(methylmethacrylate-random-trifluoroethylmethacrylate)-OH brush (P(MMA-r-TFEMA)-OH) that comprises 31 weight percent trifluoroethylmethacrylate and a poly(methylmethacrylate-random-dodecafluoroheptylmethacrylate)-OH brush (P(MMA-r-DFHMA)-OH) that comprises 93 weight percent dodecafluoroheptylmethacrylate.

Thin Film Formation

Two PtBS-b-PDMS materials, one having a number average molecular weight (Mn) of 51,600 grams per mole and 28 wt % PDMS, and the other having an Mn of 62,500 grams per mole and 28 wt % PDMS, were tested on four different brushes grafted on a silicon substrate.

Figure 2:
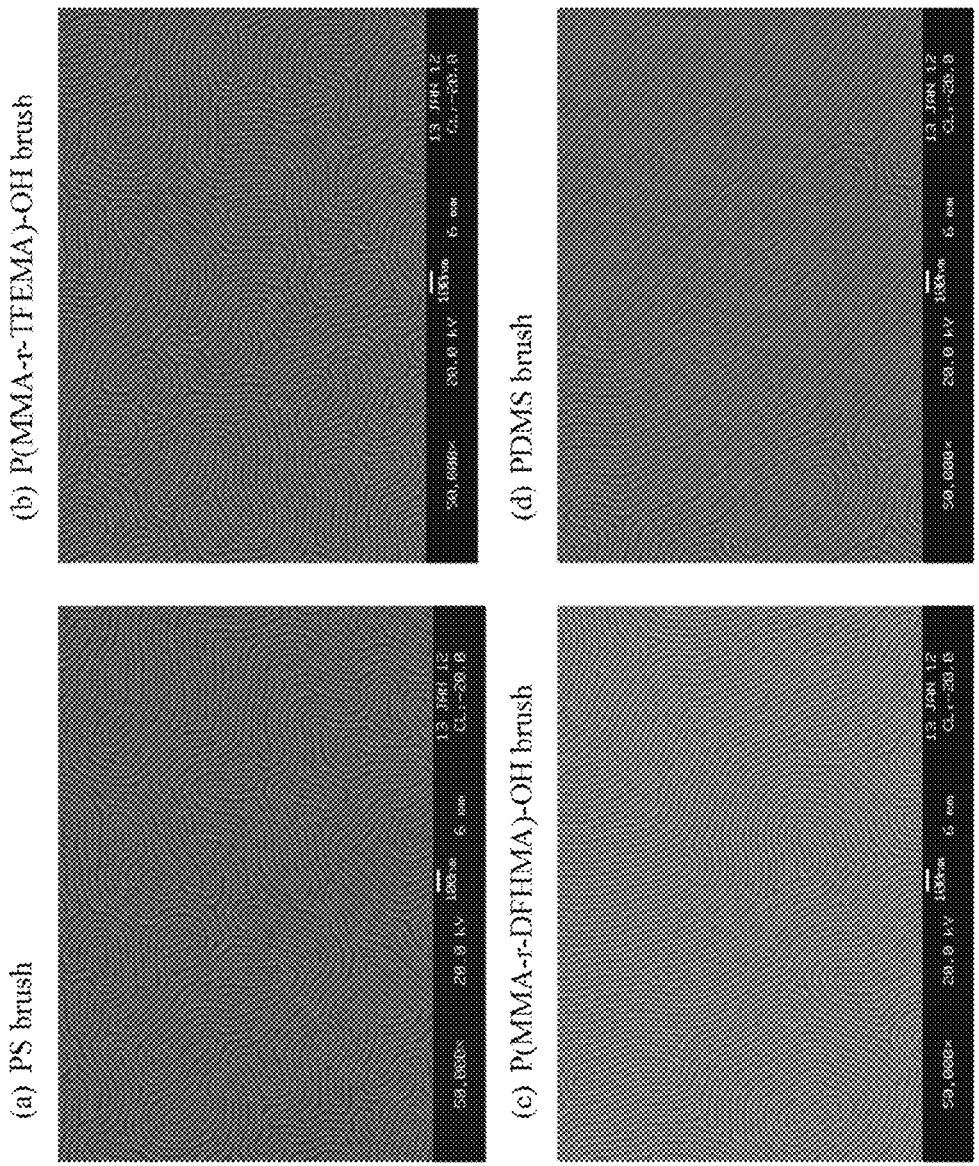
FIG. 2 depicts a series of photomicrographs of the PtBS-b-PDMS disposed on a series of different surfaces (a) polystyrene brushed silicon (b) 65-brushed silicon (c) 67-brushed silicon and (d) polydimethylsiloxane brushed silicon. The PtBS-b-PDMS has a number-average molecular weight of 51,600 grams per mole and 28 wt % PDMS.
Figure 3:
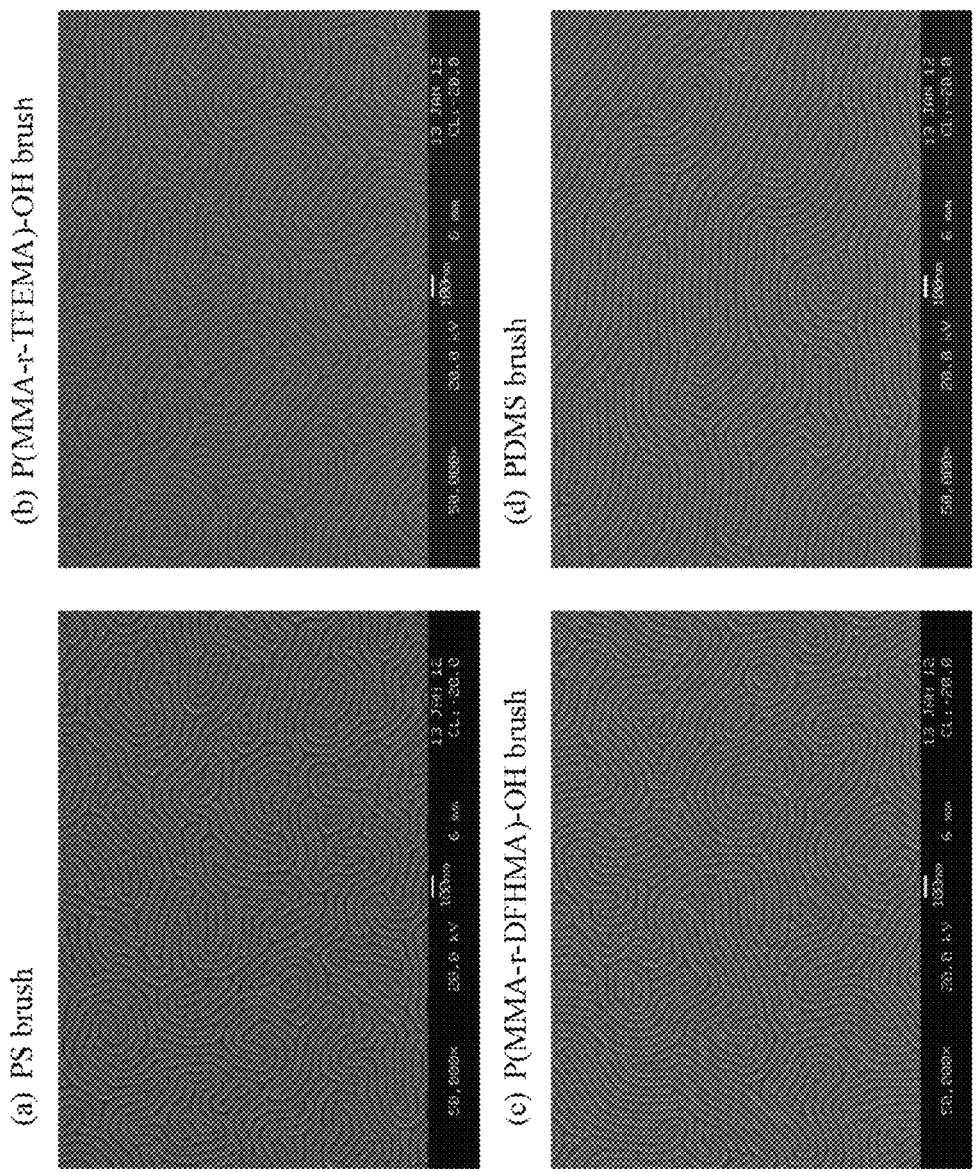
FIG. 3 depicts a series of photomicrographs of the PtBS-b-PDMS disposed on a series of different surfaces (a) polystyrene brushed silicon (b) 65-brushed silicon (c) 67-brushed silicon and (d) polydimethylsiloxane brushed silicon. The PtBS-b-PDMS has a number-average molecular weight of 62,500 grams per mole and 28 wt % PDMS.

PtBS-b-PDMS thin films were coated from a solution of PGMEA onto the silicon substrate and silicon surfaces that were treated with the brushes listed in the Table 1 above. The two different molecular materials, 51,600 grams per mole and 62,500 grams per mole, were annealed at 290° C. and 310° C. for one hour each. Prior to taking images on a scanning electron microscope (SEM), the annealed samples were first treated with a $CF_4$ plasma flash to remove the surface wetting layer followed by an $O_2$ plasma etch to remove the organic PtBS matrix. SEM images of each sample were taken at a magnification of 50,000× using an Amray 1910 scanning electron microscope. Pitch and correlation length (CL) were determined based on the SEM images using Igor Pro. The scanning electron micrographs are shown in the FIGS. 2 and 3. The results from the FIGS. 2 and 3 are summarized in the Tables 2 and 3.

Table 2 shows parameters such as the pitch ($L_0$) in nanometers, the correlation length in nanometers and the film thickness (FT) in nanometers for the PtBS-b-PDMS copolymer with Mn=51,600 grams per mole. The results from Table 2 are plotted in the FIG. 4.

TABLE 2

| Substrate | Film thickness (FT) (nm) | $L_0$ (nm) | Correlation length (CL) (nm) |
|---|---|---|---|
| Polystyrene brushed silicon substrate | 49.6 | 33.0 | 59.2 |
| Brush 65 disposed on silicon substrate | 49.8 | 33.0 | 82.2 |
| Brush 67 disposed on silicon substrate | 49.6 | 30.6 | 127 |
| PDMS brushed silicon substrate | 46.5 | 31.8 | 168 |

Table 3 shows parameters such as the pitch (L0) in nanometers, the correlation length in nanometers and the film thickness in nanometers for the PtBS-b-PDMS copolymer with Mn=62,500 grams per mole. The results from Table 3 are plotted in the FIG. 4.

TABLE 3

| Substrate | FT (nm) | $L_0$ (nm) | CL (nm) |
|---|---|---|---|
| Polystyrene brushed silicon substrate | 52.4 | 41.0 | 79.7 |
| Brush 65 disposed on silicon substrate | 53.8 | 40.1 | 94.7 |
| Brush 67 disposed on silicon substrate | 53.7 | 39.1 | 100 |
| PDMS brushed silicon substrate | 59.6 | 41.0 | 112 |

Figure 4:
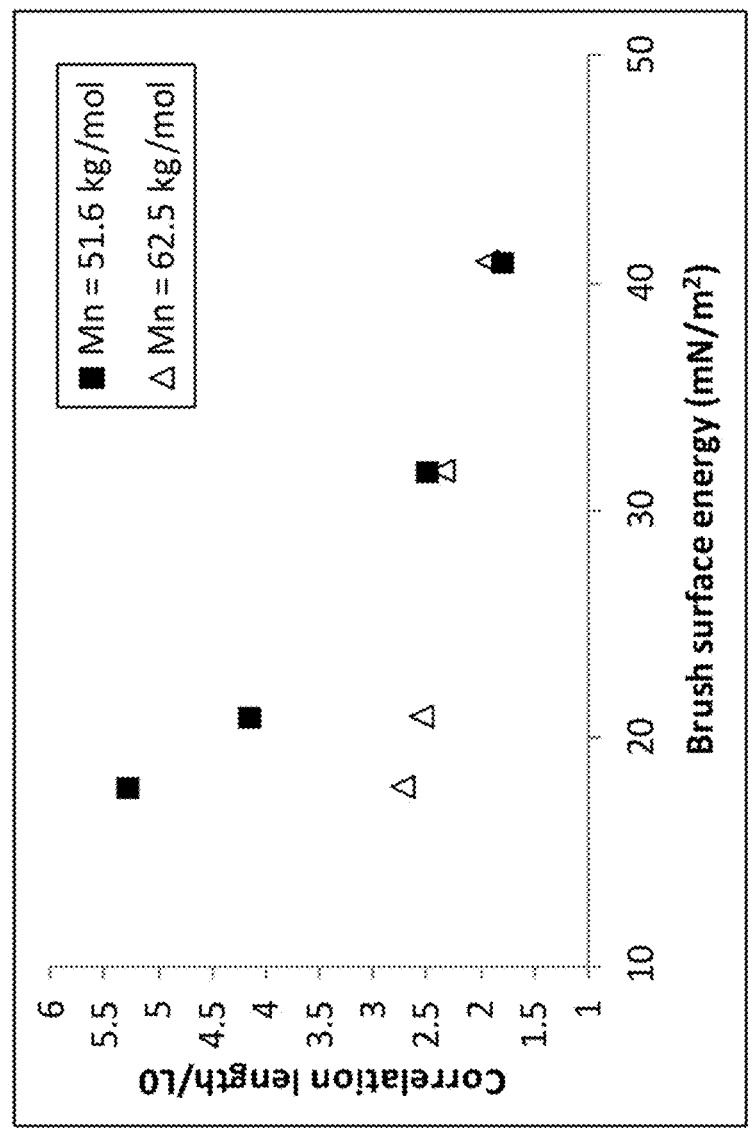
FIG. 4 shows a plot of the correlation length (CL) normalized by pitch (L0) of the PtBS-b-PDMS block copolymer plotted as a function of surface energy of the substrates coated by the four different brushes.

As can be seen in the Tables 2 and 3 and as plotted in the FIG. 4, the correlation length (CL) normalized by pitch ($L_0$) increases inversely with surface energy. This shows that brush surface energy provides a useful means to controlling the kinetics of self assembly. This shows that in addition to increasing the thermal dose (i.e., increasing annealing temperature and time), surface energy also provides another means to control self-assembly kinetics.

Example 5

This example was conducted to demonstrate trench graphoepitaxial directed self-assembly of PtBS-b-PDMS on hydroxyl terminated polybutyl styrene (PtBS-OH) and polystyrene (PS-OH) Brushes PtBS-OH Synthesis Two hydroxyl-terminated poly(tert-bytylstyrene) brushes (PtBS-OH) were made using nitroxide mediated polymerization according to the method described by Bosman et al. in *J. Am. Chem. Soc.*, 2003, 125 (3), 715-728 using 2,2,5-Trimethyl-3-(4'-p-hydroxymethylphenylethoxy)-4-phenyl-3-azahexane as initiator to give PtBS-OH materials with the following characteristics: Mn=16,100 and PDI=1.24, and Mn=35,900 grams per mole and PDI=1.39.

PS-OH Synthesis

Two hydroxyl-terminated polystyrene brushes (PS-OH) were made using nitroxide mediated polymerization according to the method described by Bosman et al. in *J. Am. Chem. Soc.*, 2003, 125 (3), 715-728 using 2,2,5-Trimethyl-3-(4'-p-hydroxymethylphenylethoxy)-4-phenyl-3-azahexane as initiator to give PS-OH materials with the following characteristics: Mn=11,000 and PDI=1.23, and Mn=20,000 grams per mole and PDI=1.18. A third PS-OH was made by the method described by Chang et al. in US2013/0209344 to give a PS-OH material with Mn=30,800 and PDI=1.06.

Thin Film Formation and Imaging

A pattern of $SiO_2$ lines on a carbon floor with an average space dimension of 118 nm were prepared using standard lithographic and etch techniques. Small coupons were cut from the wafer and used as the substrate. The surfaces of several patterned substrate coupons were modified by spin coating thereon a 2 wt % (solids) PGMEA solution of PtBS-OH and PS-OH brushes, including PtBS-OH with Mn=16,100 grams per mole and 35,900 grams per mole, and PS-OH with Mn=11,000 grams per mole, 20,000 grams per mole, 30,800 grams per mole. The substrates were then placed on a hotplate set at 120° C. for 2 minutes and another hot plate set at 250° C. under a nitrogen atmosphere for 2 minutes to attach the deposited brush layer. The substrates were then rinsed with PGMEA to wash away any unattached polymer by first soaking with PGMEA for 1 minute and then spin drying at 3,000 rpm for 1 minute. The substrates were then baked on a hotplate set at 120° C. for two minutes.

Thin films of PtBS-b-PDMS with Mn of 62,500 grams per mole and 28 wt % PDMS were then coated on the brush-treated substrates from a solution of PGMEA under conditions that give a BCP film thickness of 27 nm on an unpatterned substrate. After coating, the substrates were annealed at 120° C. for 2 minutes and then 300° C. for 2 minutes. The annealed samples were then treated with a $CHF_3$ plasma flash to remove the surface wetting layer followed by an $O_2$ plasma etch to remove the organic PtBS matrix. Top-down scanning electron microscopic (SEM) images were recorded by a Hitachi CG4000 SEM (Hitachi Co., Japan) operating at 0.2 to 2 kV accelerating voltage and 400,000 magnifications. Cross section (SEM) images were recorded by a Hitachi S-4800 FE-SEM (Hitachi Co., Japan) operating at 15 kV accelerating voltage and 400,000 magnifications. Critical dimension (CD) values of the lines and spaces were measured using ImageJ Software and are tabulated in Table 4.

TABLE 4

| Sample # | Brush Type | Brush Mn (kg/mol) | Guide-adjacent Space CD (nm) | Inter-cylinder Space CD (nm) |
|---|---|---|---|---|
| 1 | PtBS-OH | 16.1 | 9 | 20 |
| 2 | PtBS-OH | 35.9 | 12 | 18 |

TABLE 4-continued

| Sample # | Brush Type | Brush Mn (kg/mol) | Guide-adjacent Space CD (nm) | Inter-cylinder Space CD (nm) |
|---|---|---|---|---|
| 3 | PS-OH | 11.0 | 13 | 19 |
| 4 | PS-OH | 20.0 | 16 | 17 |
| 5 | PS-OH | 30.8 | 20 | 15 |

Figure 7:
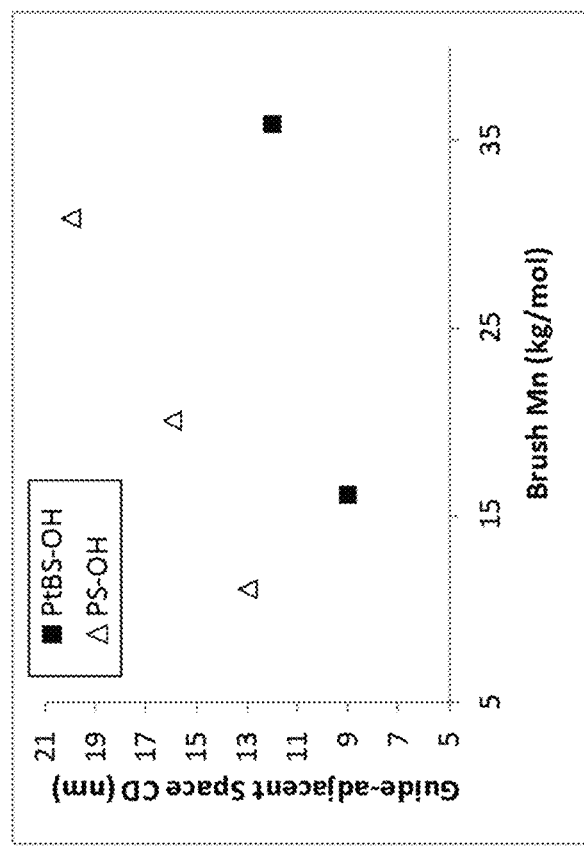
FIG. 7 is a plot of the guide-adjacent space CD after assembly of a PtBS-b-PDMS block copolymer applied on PtBS-OH and PS-OH brushes plotted as a function of brush molecular weight for PtBS-OH brush (solid squares) and PS-OH brush (open triangles). The PtBS-b-PDMS has a number-average molecular weight of 62,500 grams per mole and 28 wt % PDMS.

After alignment in trenches and etching, the siloxane material forms a resist line pattern within the $SiO_2$ lines to multiply the feature density. It is desirable for the critical dimension (CD) of the two populations of lines, one from the original $SiO_2$ guide pattern and the second from the siloxane block of the block copolymer, to be equal. Similarly, the space critical dimension should also match, in particular the space between the $SiO_2$ guide and the adjacent slioxane cylinder (the guide-adjacent space) and the space between siloxane cylinders (the inter-cylinder space). With block copolymer of large pitch ($L_0$>30 nm), it is often difficult to achieve matching space CDs as the guide-adjacent space CD is often smaller than the inter-cylinder space CD. For example, when using PtBS-b-PDMS as the block copolymer and PtBS-OH as the brush layer as can be seen in Table 4, Sample #s 1 and 2, the space CD is limited to <~13 nm even when using a PtBS-OH brush with relatively high molecular weight (Mn=35,900 grams per mole). However, as shown in Table 4, Sample #s 3-5 and in FIG. 7, the combination of a PS-OH brush with PtBS-b-PDMS block copolymer gives larger guide-adjacent space CDs as a function of the brush molecular weight than the combination of PtBS-b-PDMS with PtBS-OH brush. For example, guide-adjacent space CDs of 13 nm were achieved with PS-OH with Mn=11,000 grams per mole and up to 20 nm with PS-OH with Mn=30,800 grams per mole. This demonstrates the utility of the combination of a brush and block copolymer where the brush has a different composition from either block of the BCP, particularly for cases of directed self assembly where large guide-adjacent space CD is required.

The block copolymer disclosed herein can be used for manufacturing articles such as semiconductors, field effect transistors, and the like.

What is claimed is:

1. An article comprising:
a brush polymer; where the brush polymer is reacted with a substrate upon which it is disposed; and
a block copolymer; where the block copolymer comprises a first block and a second block that are covalently bonded to each other; where the first block comprises a first polymer and a second block comprises a second polymer; where the first polymer comprises less than or equal to 10 atomic percent of silicon; where the second polymer comprises at least 15 atomic percent silicon; where the brush polymer is chemically different from the first polymer and the second polymer; and where the first polymer is chemically different from the second polymer;
and wherein the block copolymer is disposed upon the brush polymer; where the first block comprises a first polymer derived from o-methylstyrene, m-methylstyrene, o-ethylstyrene, m-ethylstyrene, p-ethylstyrene, α-methyl-p-methylstyrene, 2,4-dimethylstyrene, monochlorostyrene, 4-tert-butylstyrene, or a combination thereof.

2. The article of claim 1, where the brush polymer has a surface energy that is lower than the surface energy of the block copolymer.

3. The article of claim 1, where the brush polymer has a surface energy that is higher than the surface energy of the block copolymer.

4. The article of claim 1, where the brush polymer has the structure of formulas (7A) or (7B):

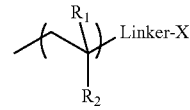

(7A)

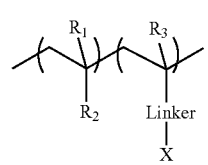

(7B)

where the reactive species X is a hydroxyl group, a thiol group, an amine group, a carboxyl group, a silane group or an alkoxy groups, $R_1$, $R_2$ and $R_3$ are the same or different and is a hydrogen, a $C_{1-10}$ alkyl group, a $C_{1-10}$ alkyl ester group, a $C_{3-10}$ cycloalkyl ester group, a $C_{7-10}$ aralkyl ester group, a $C_6$-$C_{14}$ aryl, a $C_7$-$C_{13}$ alkylaryl or a $C_7$-$C_{13}$ arylalkyl group.

5. The article of claim 1, where the brush polymer is a polystyrene, a polysiloxane, a polymethylmethacrylate, a polyacrylate, a polyvinylacetate, a polydiene, a polyether, a polyester, a polysiloxane, a polyorganogermane, or a combination comprising at least one of the foregoing polymers.

6. The article of claim 1, where the brush polymer is a copolymer; where the brush copolymer is poly(styrene-b-vinyl pyridine), poly(styrene-b-butadiene), poly(styrene-b-isoprene), poly(styrene-b-methyl methacrylate), poly(styrene-b-alkenyl aromatics), poly(isoprene-b-ethylene oxide), poly(styrene-b-(ethylene-propylene)), poly(ethylene oxide-b-caprolactone), poly(butadiene-b-ethylene oxide), poly(styrene-b-t-butyl (meth)acrylate), poly(methyl methacrylate-b-t-butyl methacrylate), poly(ethylene oxide-b-propylene oxide), poly(styrene-b-tetrahydrofuran), poly(styrene-b-isoprene-b-ethylene oxide), poly(styrene-b-dimethylsiloxane), poly(styrene-b-trimethylsilylmethyl methacrylate), poly(methyl methacrylate-b-dimethylsiloxane), poly(methyl methacrylate-b-trimethylsilylmethyl methacrylate), or a combination comprising at least one of the foregoing copolymers.

7. The article of claim 1, where the brush polymer is a hydroxyl terminated polystyrene, hydroxyl terminated polydimethylsiloxane, hydroxyl terminated poly(methylmethacrylate-random-trifluoroethylmethacrylate), a hydroxyl terminated poly(methylmethacrylate-random-dodecafluoroheptylmethacrylate), or a combination comprising at least one of the foregoing polymers.

8. The article of claim 1, where the brush polymer comprises an ethylenically unsaturated monomer that is represented by formula (1):

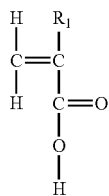

(1)

where $R_1$ is a hydrogen or an alkyl group having 1 to 10 carbon atoms, by the formula (2):

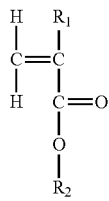

(2)

where $R_1$ is a hydrogen or an alkyl group having 1 to 10 carbon atoms and $R_2$ is a $C_{1-10}$ alkyl, a $C_{3-10}$ cycloalkyl, or a $C_{7-10}$ aralkyl group, or by the formula (3):

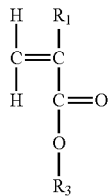

(3)

where $R_1$ is a hydrogen or an alkyl group having 1 to 10 carbon atoms and $R_3$ is a $C_{2-10}$ fluoroalkyl group.

9. The article of claim 1, where the block copolymer comprises a polysiloxane has the structure of formula (4)

(4)

wherein each R is independently a $C_1$-$C_{10}$ alkyl, a $C_3$-$C_{10}$ cycloalkyl, a $C_6$-$C_{14}$ aryl, a $C_7$-$C_{13}$ alkylaryl or a $C_7$-$C_{13}$ and where n in the formula (4) is 25 to 5,000.

10. The article of claim 1, where the block copolymer is poly(t-butylstyrene)-b-poly(dimethylsiloxane).

11. A method comprising:
disposing a brush polymer upon a substrate; where the brush polymer comprises a reactive moiety that is reacted with the substrate; and
disposing upon the brush a block copolymer; where the block copolymer comprises a first block and a second block that are covalently bonded to each other; where the first block comprises a first polymer and a second block comprises a second polymer; where the first polymer comprises less than or equal to 10 atomic percent silicon; where the second polymer comprises at least 15 atomic percent silicon; where the brush polymer is chemically different from the first polymer and the second polymer; and where the first polymer is chemically different from the second polymer; where the first block comprises a first polymer derived from o-methylstyrene, m-methylstyrene, o-ethylstyrene, m-ethylstyrene, p-ethylstyrene, α-methyl-p-methylstyrene, 2,4-dimethylstyrene, monochlorostyrene, 4-tert-butylstyrene, or a combination thereof.

12. The method of claim 11, further comprising annealing the substrate.

13. The method claim 11, further comprising etching at least one block of the block copolymer.

* * * * *